United States Patent [19]
Cok

[11] Patent Number: 5,828,379
[45] Date of Patent: Oct. 27, 1998

[54] COMPUTER PROGRAM PRODUCT FOR GENERATING A SOFT EDGE ON A DIGITAL MASK

[75] Inventor: David R. Cok, Rochester, N.Y.

[73] Assignee: Eastman Kodak Company, Rochester, N.Y.

[21] Appl. No.: 800,892

[22] Filed: Feb. 12, 1997

[51] Int. Cl.$^6$ .................................................. G06K 15/00
[52] U.S. Cl. ........................................................... 345/429
[58] Field of Search ..................................... 345/429, 430, 345/431, 432

[56] References Cited

U.S. PATENT DOCUMENTS

5,185,855 2/1993 Kato et al. ............................. 345/429
5,187,658 2/1993 Cline et al. ............................. 345/429
5,461,703 10/1995 Goyins et al. ....................... 345/429 X Primary Examiner—Cliff N. Vo
Attorney, Agent, or Firm—Peyton C. Watkins

[57] ABSTRACT

A computer program product for inputting a desired soft edge into a digital mask comprises a computer readable storage medium having a computer program stored thereon for performing the steps of selecting the desired profile having a predetermined hard-edge position and transition width; selecting a distance from the hard-edge position to a boundary of the transition width for forming a kernel distance; determining a minimum distance to the hard edge for each pixel within the kernel distance from the hard edge; substituting values from the desired profile for each pixel within the kernel distance from the hard edge using the minimum distance of the pixel from the hard edge.

16 Claims, 6 Drawing Sheets

COMPUTER PROGRAM PRODUCT FOR GENERATING A SOFT EDGE ON A DIGITAL MASK

CROSS-REFERENCE TO RELATED APPLICATIONS

The present application is related to U.S. application Ser. No. 08/699,316, filed Aug. 19, 1996, by David R. Cok et. al., and entitled, "A COMPUTER PROGRAM PRODUCT FOR DEFINING A SOFT EDGE FOR A DIGITAL MASK".

FIELD OF THE INVENTION

The invention relates generally to the field of generating a soft edge for a digital mask and, more particularly, to generating such edges so that only portions of the digital mask which are to contain the soft edge are examined and, consequently, computed with the predetermined soft edge.

BACKGROUND OF THE INVENTION

Computer programs for editing either moving or still images typically include creating a digital mask or matte for defining the portions of the image which are to be modified, such as the portion of the image to have color adjustments. The mask includes a plurality of pixels having either a maximum value or a minimum value for either completely enabling the editing operation at pixels having a preselected value, for example one, and for completely disabling the editing operation at pixels having the other value, for example zero.

A typical method, which defines the boundary between the portion of the image which is to be edited and the portion which is not to be edited, includes drawing geometric objects, such as circles and polygons, on the mask. The geometric objects are generally referred to in the art as having hard edges.

It may also be desirable to create a "soft edge" on the mask for defining portions of the image which are to be partially modified by the editing operation in proportion to the pixel values so as to create a gradual transition between the modified and non-modified portions, generally referred to in the art as a gray-scale mask. The pixels in a gray scale mask typically include a range of values between completely on (zero) and completely off (one) each of which pixel values indicate the proportion to which the pixel is to be modified. Methods for defining a particular type of soft edge are well known in the art.

Once a desired soft edge profile is created, it can be applied to the mask by a well known blurring technique, which is implemented over the entire mask.

Although the presently known and utilized method and system are satisfactory, they are not without drawbacks. Blurring an entire mask is time consuming due to the fact that portions of the mask which are not to contain the soft edge are also blurred. In addition, blurring is limited in the shape of the soft edge that can be formed.

Consequently, a need exists for an improved method and system for overcoming the above-described drawbacks.

SUMMARY OF THE INVENTION

The present invention is directed to overcoming one or more of the problems set forth above. Briefly summarized, according to one aspect of the present invention, the invention resides in a computer program product for generating a predetermined soft edge for a digital mask, comprising: a computer readable storage medium having a computer program stored thereon for performing the steps of: (a) selecting the desired profile having a predetermined hard edge and transition width; (b) selecting a distance from the hard edge to a boundary of the transition width for forming a kernel; (c) determining a minimum distance to the hard edge for each pixel within the kernel distance from the hard edge; (d) substituting values from the desired profile for each pixel within the kernel distance from the hard edge using the minimum distance of the pixel from the hard edge.

It is an object of the present invention to overcome the above-described drawbacks.

It is an object of the present invention to perform computations on the mask only within a region near the object boundaries in the mask.

It is a feature of the present invention to form a boundary surrounding the hard edge defined by a kernel distance.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

In addition, a computer readable storage medium as used herein includes magnetic storage media such as a magnetic disc (such as a floppy disk) or magnetic tape; optical storage media such as optical disc, optical tape, or machine readable bar code; solid state electronic storage devices such as random access memory (ROM), or read only memory (RAM); or any other physical device or medium employed to store a computer program.

Figure 1:
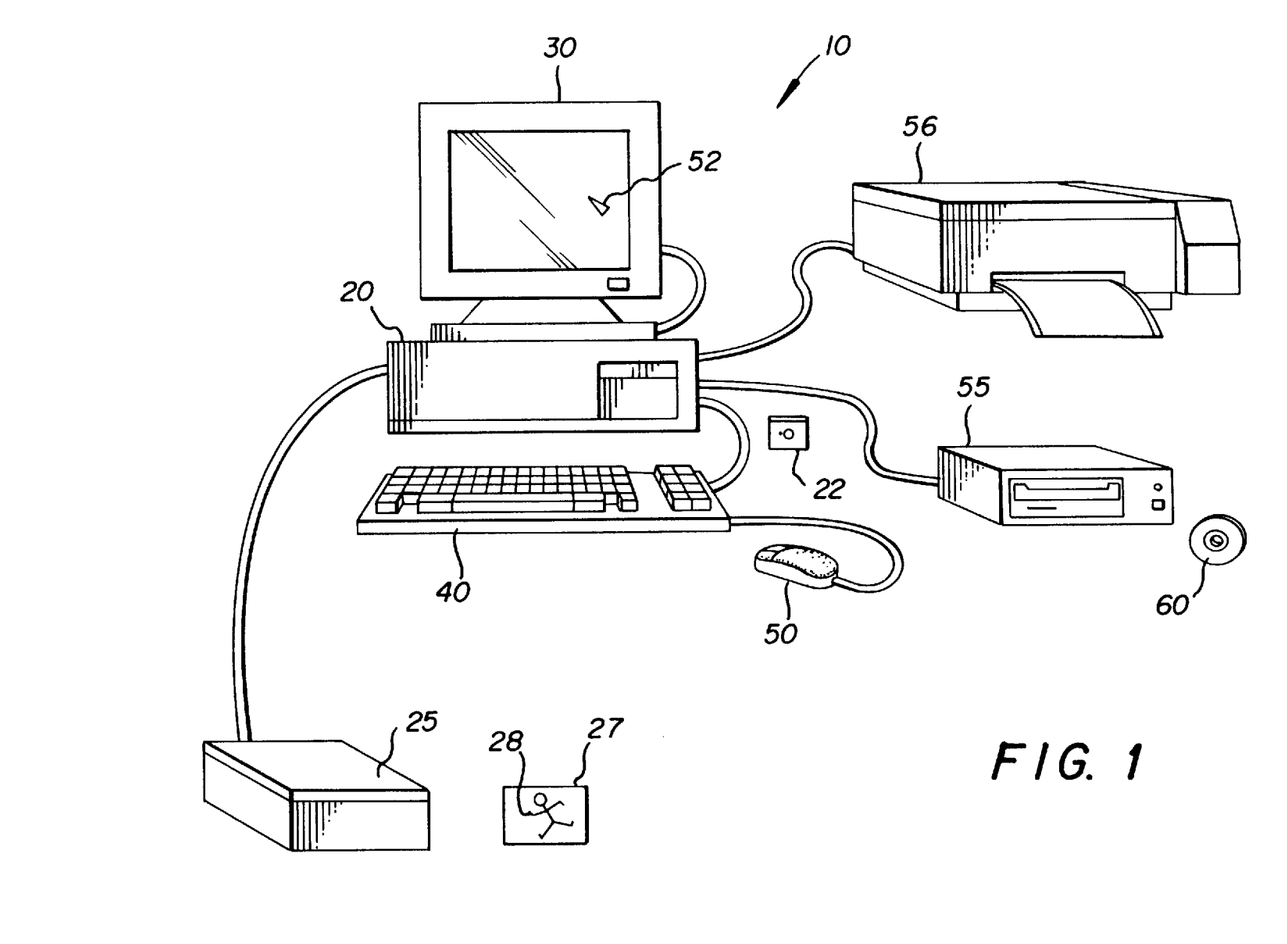
FIG. 1 is a perspective view of a computer system for implementing the present invention.

Referring now to the drawings, and particularly to FIG. 1, there is illustrated a computer system 10 which may be used for implementing the present invention. Although the computer system 10 is shown utilizing a still photograph, the present invention is not limited to still photographs, but may also be used on moving pictures as will be apparent to those skilled in the art. The computer system 10 includes a microprocessor based unit 20 for receiving and processing software programs and for performing other processing functions. Software programs may be received by the microprocessor based unit 20 either from a floppy disk 22 which is inserted into the microprocessor based unit 20, or preprogrammed into memory 23 contained in the microprocessor based unit 20.

A scanner 25 is electrically connected to the microprocessor based unit 20 for digitizing a photographic image 27 that is placed on the scanner 25, and for sending the digitized image to the microprocessor based unit 20. The digitized image contains a plurality of pixels each having values between maximum and minimum values inclusive, for example typically between 0–255 or between 0 and 1023. Alternatively, images may be stored on storage media, such as magnetic disks, before use and after modification.

A display 30 is electrically connected to the microprocessor based unit 20 for displaying user-related information associated with the software. A keyboard 40 is also connected to the microprocessor based unit 20 for allowing a user to input information to the software. In addition to using the keyboard for input, a mouse 50 may be used for moving a selector 52 on the display 30 and for selecting an item on which the selector 52 overlays, such as generally referred to in the art as selection, cutting, copying and pasting.

An alternative method of inputting software programs to the microprocessor based unit 20 includes connecting a compact disk-read only memory (CD-ROM) 55 to the microprocessor based unit 20 for receiving software programs and for providing a means of inputting the software programs and other information to the microprocessor based unit 20. The CD-ROM receives the software via a compact disk 60 on which the software program is stored and which is inserted into the CD-ROM 55. A printer 56 is connected to the microprocessor based unit 20 for printing a hardcopy of the output of the computer system 10.

It is instructive to note that the digital representation of the image is stored in memory 23, and is sent to the monitor 30 for visually displaying the image, as is well known in the art. The input devices 40 and 50 permit various editing changes to be input to software of the present invention, which changes are then visually displayed on the monitor 30, and are actually implemented on the digital representation of the image. As previously described, the digital representation (not shown) includes a plurality of pixels 75 each having values between maximum and minimum values inclusive, for example typically between 0–255 or between 0 and 1023.

Figure 2:
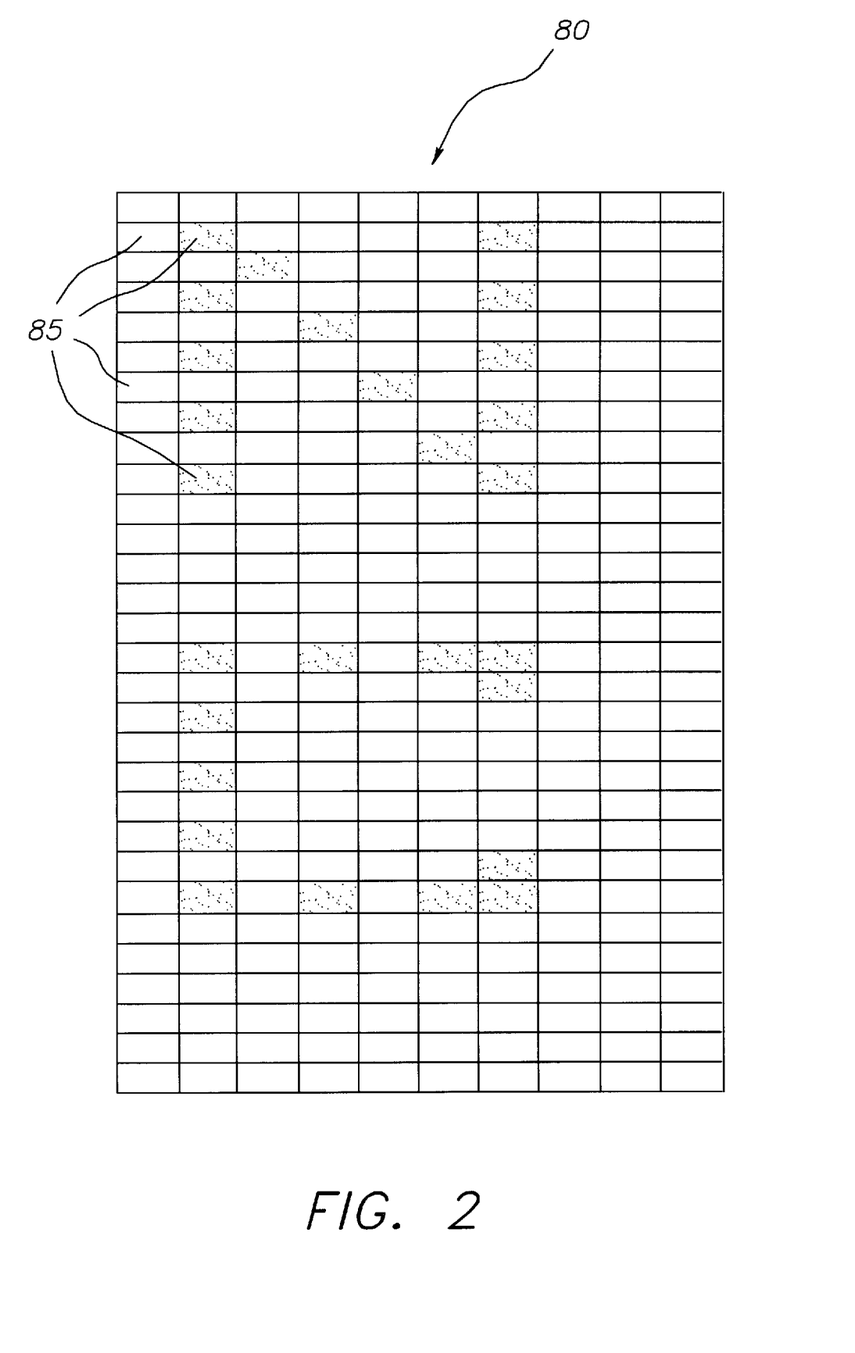
FIG. 2 is an illustration of a digitized mask.

Referring to FIG. 2, the software of the present invention creates a gray-scale mask 80 having a plurality of pixels 85 having either a maximum or minimum value for either completely enabling the editing operation at pixels having a preselected value, for example one, or for completely disabling the editing operation at pixels having the opposite value, for example a value of zero. It may also include a plurality of pixels 85 having values greater than the minimum and less than the maximum for defining portions of the mask 80 which are to be modified in proportion to the pixel value, which will be input into the gray-scale mask 80 by the below-described method. It is instructive to note that the values 1 and 0 are representative of a maximum (on) value and a minimum (off) value. Typically, the minimum is zero and the maximum may be 255 or 1023.

Figure 3A:
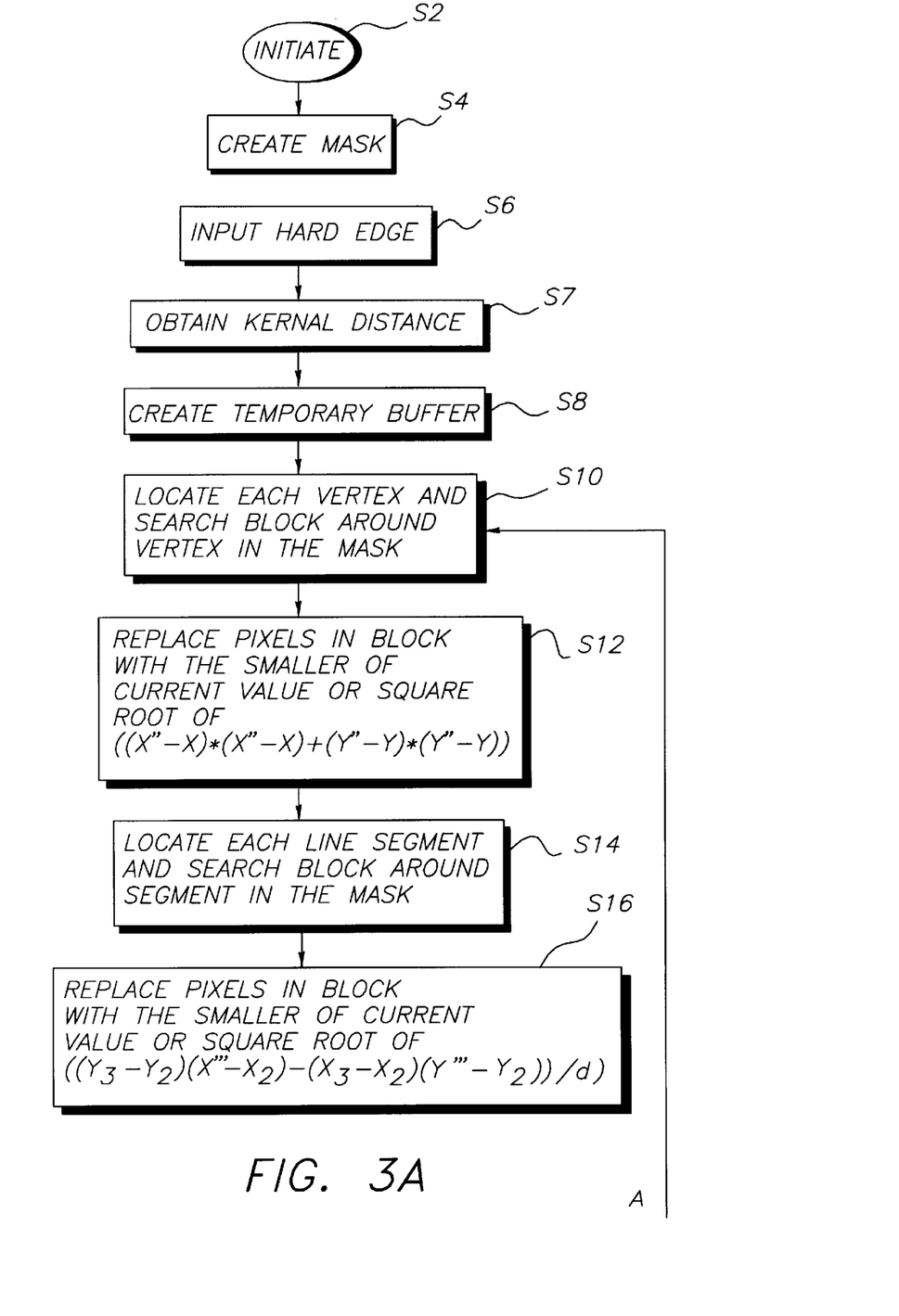
FIG. 3A–3B are a flowcharts of a software program of the present invention.
Figure 3B:
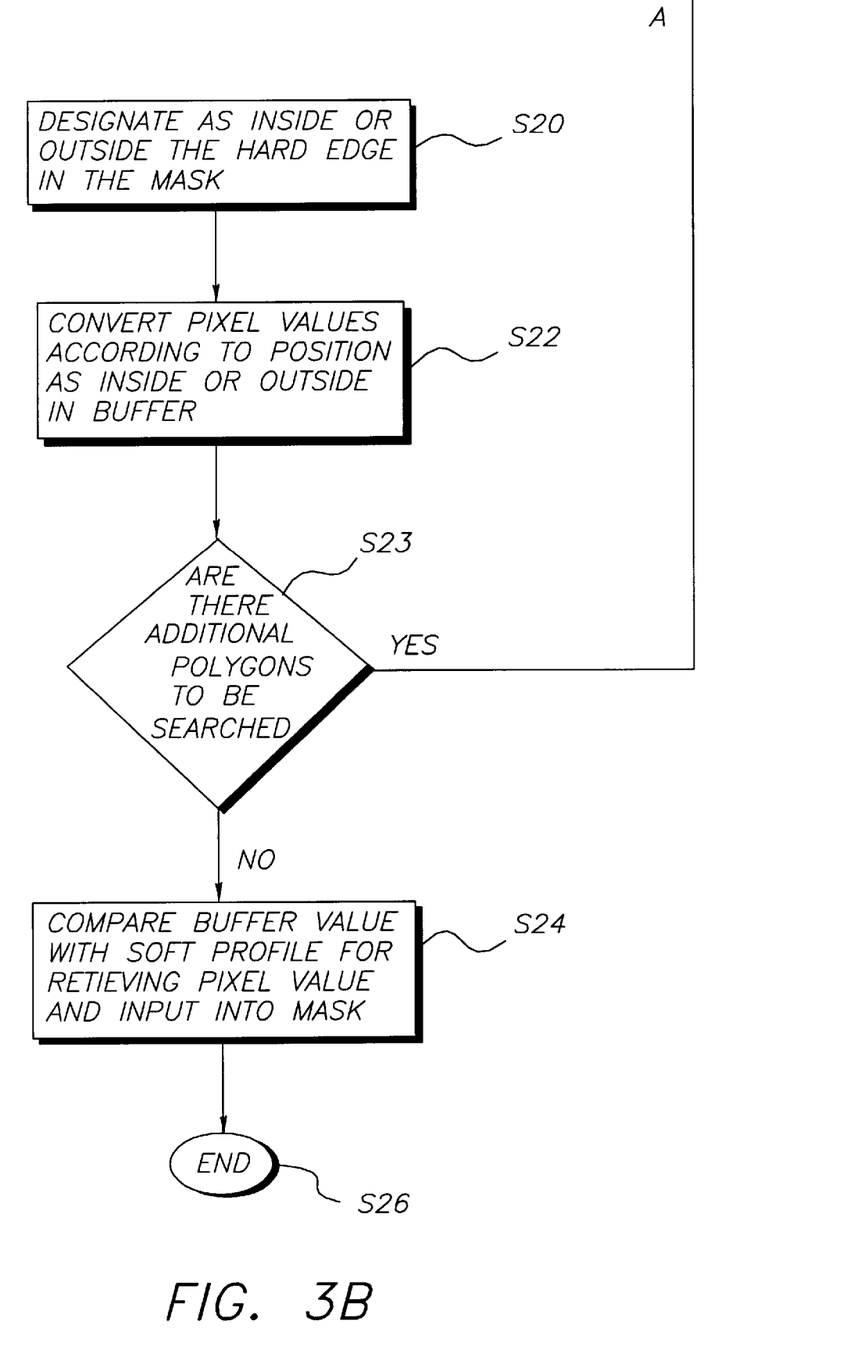

Referring specifically to the FIG. 3, there is illustrated a flowchart of software of the present invention. However, before discussing the software program of the present invention, it is instructive to note that the software program of the present invention also conjunctionally uses any standard image processing software, such as "ADOBE PHOTOSHOP" or "CINEON" software, for implementing editing changes in proportion to that indicated by the software of the present invention.

The software is first initiated S2 for displaying the image on the monitor 30. A mask 80 associated with the image is created S4 and input into a buffer, or memory 23. The mask 80 initially includes a plurality of pixels having values which are all the same value, for example zero. The user inputs a hard edge S6 by various methods known in the art such as by drawing a geometric object 90 (see FIG. 5), such as a circle or polygon, for distinguishing between the portion which is to be modified, and the portion which is not to be modified. The portion enclosed by the geometric object preferably represents the portion to be modified by the processing software, and the pixels outside the object represent the portion that is not to be modified, or vice versa.

It is instructive to note that a profile function is input, as described below, to the software for indicating the desired values for the pixels in the soft edge. Such a profile may be obtained from U.S. application Ser. No. 08/699,316, or may be obtained from other techniques which are well known in the art.

Figure 4:
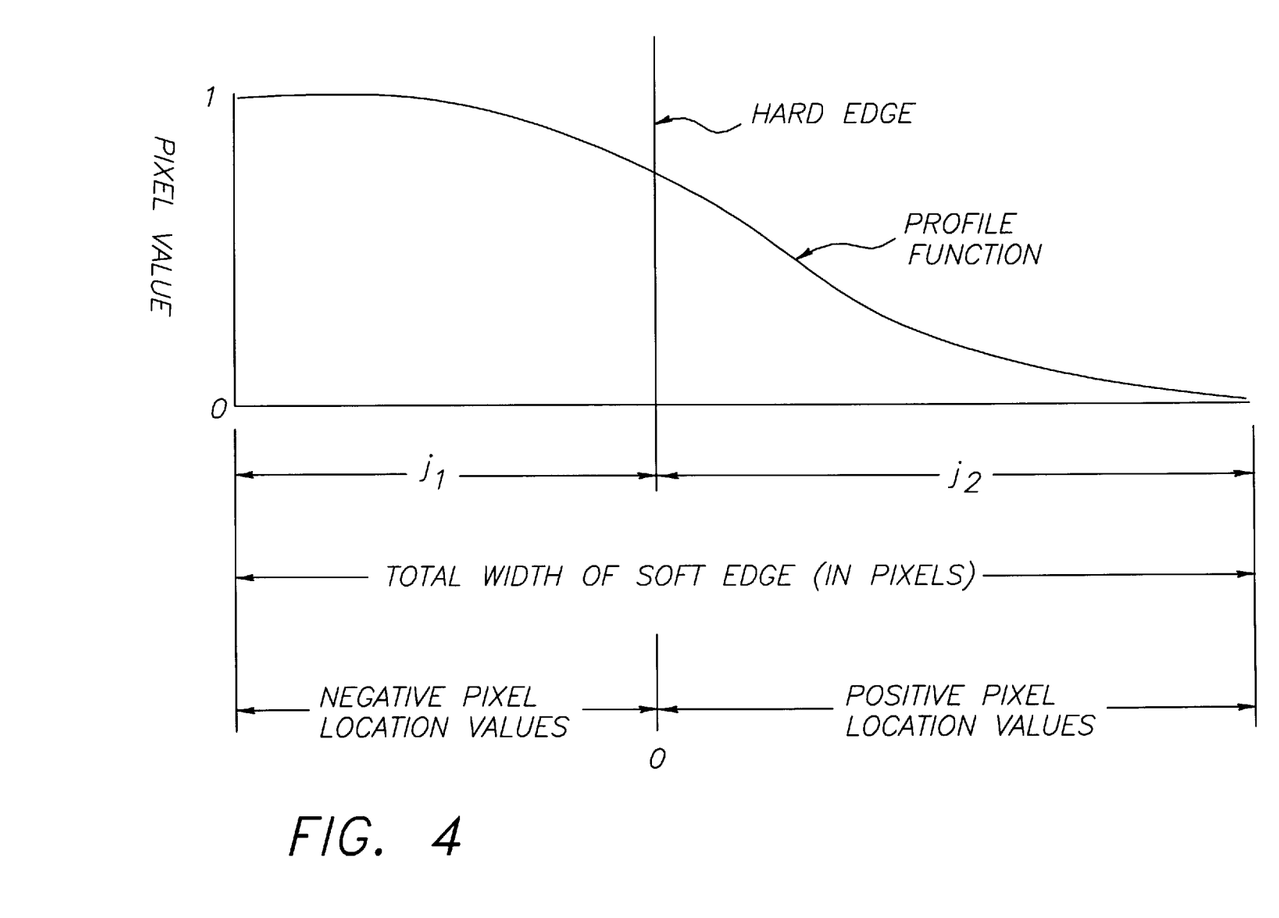
FIG. 4 is a graph of a typical soft edge.

Referring briefly to FIG. 4, a graphical representation of the profile function includes a hard edge in its center portion, and two distances $j_i$ and $j_2$ (measured in number of pixels) that are measured from the hard edge to the inside and outside of the desired soft edge.

Referring back to FIGS. 3 and 5, the software compares S7 the two values ($j_i$ and $j_2$) for determining the larger value, which is hereinafter referred to as a kernel distance (k). A temporary buffer, having the same dimensions as the mask increased by 2k in both height and width, is then created S8 and stored in a buffer or memory 23 for creating a means which will indicate the portions of the mask to have the soft edge. The values for each pixel in the temporary buffer are initially set to any value larger than $2k^2$.

The hard edge in the mask is traversed for locating each vertex V on the hard edge, where x,y denotes the coordinates in the Cartesian coordinate system. At each vertex, a rectangular-shaped block of pixels is formed S10 defined by the coordinates x−k to x+k and y−k to y+k (see FIG. 5). At each pixel, for example (x",y"), within the block of pixels, the stored value in the temporary buffer having the corresponding pixel location is replaced S12 with the smaller of the current value or the value defined by square root of $((x"-x)*(x"-x)+(y"-y)*(y"-y))$.

Figure 5:
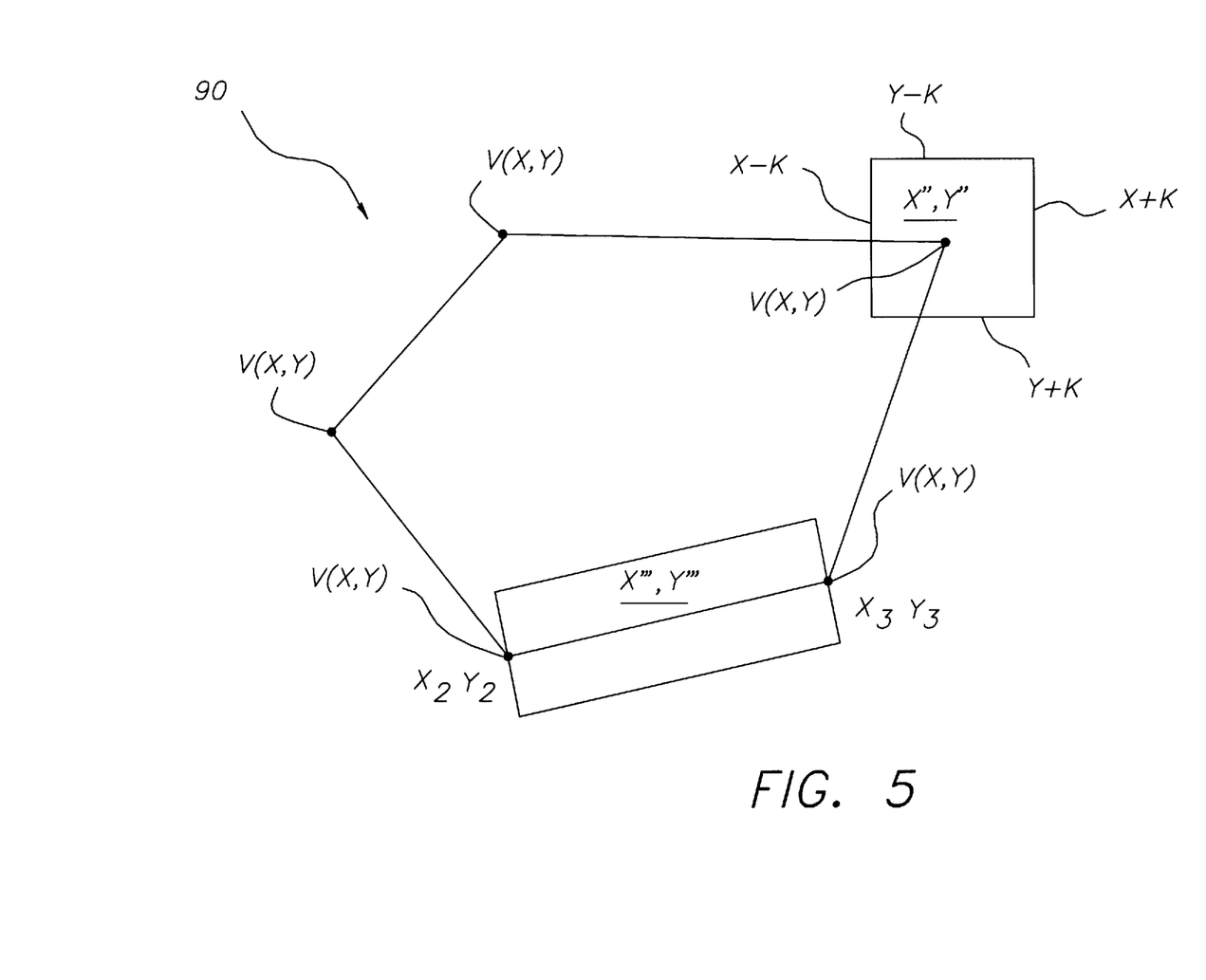
FIG. 5 is diagram of a typical hard edge.

Each line segment of the object 90 in the mask is then located, and is defined as being positioned between adjacent vertexes, for example ($x_2 y_2$) to ($x_3 y_3$). A value for d is first defined as square root of $((x_3-x_2)*(x_3-x_2)+(y_3-y_2)*(y_3-y_2))$ A region of pixels is then searched S14 adjacent each line segment that is bounded by the following coordinate values. The height is searched from (minimum value of $(Y_2, Y_3))-k *$ absolute value of $(x_3-x_2)/d$ to (maximum value of $(Y_2, Y_3))+k*$absolute value of $(x_3-x_2)/d$. The width is searched from a minimum of $(x_2,x_3)-k*$absolute value of $(y_3-y_2)/d$ to a maximum value of $(x_2,x_3)+k*$absolute value of $(Y_3-Y_2)/d$.

At each pixel (x'",y'") defined by the above-described equations, the stored value in the temporary buffer having the corresponding pixel location is set S16 to a value of the smaller of its current value and the absolute value of $(((y_3-y_2)(x'"-x_2)-(x_3-x_2)(Y'"-Y_2))/d$.

Each pixel location that now composes the temporary buffer is then compared to its corresponding pixel location in the mask for determining whether it is inside or outside the hard edge S20. Each value (t) that now composes the temporary mask is converted S22 to negative (t) if it is inside the hard edge, and those inside the hard edge are designated positive (t).

If there are additional polygons to be searched the above steps are repeated S23.

Referring to FIGS. 3 and 4, the values in the temporary buffer are then compared to the profile function which the user has designated, and each location in the buffer having a value corresponding to a pixel location value from the soft profile is substituted S24 with the pixel value from the soft edge. Each location in the buffer having a substituted value has its value input into the corresponding pixel location in the mask for indicating the soft edge. The software may then be exited S26.

It is instructive to note that circles may also be used as a hard edge in which case the circle is approximated by a polygon and the above-described method is performed on the polygon or the distance to the closest point on the circular boundary may be determined by direct geometric calculation.

Still further, when there is more than one shape, the data from multiple shapes is handled as follows. As already stated, for each shape (individually) determine the distance from the hard edge (d) and whether the pixel in question is inside or outside the hard edge. Then, if the pixel is outside all the shapes, use the minimum of all the distances as the distance to the edge. If the pixel is inside at least one shape, then ignore all shapes for which the pixel is outside the shape and use the maximum distance to the edge as the distance to be looked up in the profile function.

The invention has been described with reference to a preferred embodiment. However, it will be appreciated that variations and modifications can be effected by a person of ordinary skill in the art without departing from the scope of the invention.

Parts List:
10—computer system
20—microprocessor based unit
22—floppy disk
23—memory
25—scanner
27—photographic image
30—display
40—keyboard
50—mouse
52—selector
55—CD-ROM
56—printer
60—compact disk
75—pixels
80—mask
85—pixels
90—geometric object

I claim:

1. A computer program product used in a computer system, for inputting a desired soft edge into a digital mask, comprising: a computer readable storage medium having a computer program stored thereon for performing the steps of:
   (a) selecting the desired profile having a predetermined hard-edge position and transition width;
   (b) selecting a distance from the hard-edge position to a boundary of the transition width for forming a kernel distance;
   (c) determining a minimum distance to the hard edge for each pixel within the kernel distance from the hard edge;
   (d) substituting values from the desired profile for each pixel within the kernel distance from the hard edge using the minimum distance of the pixel from the hard edge.

2. The computer program product used in a computer system as in claim 1, wherein step (d) includes substituting a pixel value from the desired profile having the kernel distance for the value of each pixel in the boundary having substantially the same kernel distance.

3. The computer program product used in a computer system as in claim 2, wherein the selected distance is the largest distance from the hard edge to the end of the transition width.

4. The computer program product used in a computer system as in claim 1 further comprising creating the hard edge by inputting a geometric object.

5. The computer program product used in a computer system as in claim 4, wherein step (c) includes determining the minimum distance of a pixel to the hard edge by determining the distance of the pixel from each vertex of the geometric object.

6. The computer program product used in a computer system as in claim 4, wherein step (c) includes determining the minimum distance of a pixel to the hard edge by determining the distance of the pixel from each line segment of the geometric object.

7. The computer program product used in a computer system as in claim 4, wherein step (c) includes determining the minimum distance of a pixel to the hard edge by determining the distance of the pixel from each arc of the geometric object.

8. The computer program product used in a computer system as in claim 1, wherein step (c) includes combining minimum distances of a pixel to hard edges of multiple shapes.

9. A computer program product used in a computer system, comprising: a computer readable storage medium including program means comprising:
   (a) means for selecting the desired profile having a predetermined hard-edge position and transition width;
   (b) means for selecting a distance from the hard-edge position to a boundary of the transition width for forming a kernel distance;
   (c) means for determining a minimum distance to the hard edge for each pixel within the kernel distance from the hard edge;
   (d) means for substituting values from the desired profile for each pixel within the kernel distance from the hard edge using the minimum distance of the pixel from the hard edge.

10. The computer program product used in a computer system as in claim 9, wherein said substituting means includes means for substituting a pixel value from the desired profile having the kernel distance for the value of each pixel in the boundary having substantially the same kernel distance.

11. The computer program product used in a computer system as in claim 10, wherein said selecting distance means includes means for selecting the largest distance from the hard edge to the end of the transition width.

12. The computer program product used in a computer system as in claim 9 further comprising means for creating the hard edge by inputting a geometric object.

13. The computer program product used in a computer system as in claim 12, wherein said determining means includes means for determining the minimum distance of a pixel to the hard edge by determining the distance of the pixel from each vertex of the geometric object.

14. The computer program product used in a computer system as in claim 12, wherein said determining means includes means for determining the minimum distance of a pixel to the hard edge by determining the distance of the pixel from each line segment of the geometric object.

15. The computer program product used in a computer system as in claim 12, wherein said determining means includes means for determining the minimum distance of a pixel to the hard edge by determining the distance of the pixel from each arc of the geometric object.

16. The computer program product used in a computer system as in claim 9, wherein said determining means includes means for combining minimum distances of a pixel to hard edges of multiple shapes.

* * * * *